United States Patent [19]

Maeda et al.

[11] Patent Number: 5,410,526
[45] Date of Patent: Apr. 25, 1995

[54] DISC REPRODUCING APPARATUS AND DISC RECORDING APPARATUS

[75] Inventors: Yasuaki Maeda, Kanagawa; Kosuke Nakamura, Tokyo, both of Japan

[73] Assignee: Sony Corporation, Japan

[21] Appl. No.: 13,629

[22] Filed: Feb. 4, 1993

[30] Foreign Application Priority Data

Feb. 5, 1992 [JP] Japan .................................. 4-054295
Feb. 5, 1992 [JP] Japan .................................. 4-054296

[51] Int. Cl.⁶ ............................................... G11B 7/00
[52] U.S. Cl. ....................................... 369/48; 369/58; 369/60; 369/47
[58] Field of Search ..................... 369/48, 47, 49, 53, 369/54, 58, 59, 60, 124, 32, 33, 44.78

[56] References Cited

U.S. PATENT DOCUMENTS

| | | | |
|---|---|---|---|
| 4,110,564 | 8/1978 | Andresen | 179/15.55 T |
| 4,860,272 | 8/1989 | Nishikawa et al. | 369/44.28 |
| 4,872,073 | 10/1989 | Fincher et al. | 360/51 |
| 5,130,863 | 7/1992 | Yamashita et al. | 369/48 |
| 5,157,646 | 10/1992 | Amemiya et al. | 369/47 |
| 5,243,588 | 9/1993 | Maeda et al. | 369/54 |

FOREIGN PATENT DOCUMENTS

| | | | |
|---|---|---|---|
| 0140456A1 | 5/1985 | European Pat. Off. | |
| 0383298A3 | 8/1990 | European Pat. Off. | |
| 0391584A3 | 10/1990 | European Pat. Off. | G06F 5/06 |
| 0423050A1 | 4/1991 | France | |
| 2205423A | 12/1988 | United Kingdom | G06F 3/06 |

OTHER PUBLICATIONS

Patent Abstracts Of Japan, vol. 10, No. 264 (P-495) (2320), 9 Sep. 1986 & JP-A-61 087 278 (Hitachi).

Primary Examiner—Georgia Y. Epps
Assistant Examiner—Muhammad N. Edun
Attorney, Agent, or Firm—Alan S. Hodes; Limbach & Limbach

[57] ABSTRACT

A disc reproducing apparatus for reproducing voice data recorded on an optical disc by successive predetermined amounts and recording the reproduced data temporarily in a RAM for subsequent continuous reproduction, and a disc recording apparatus for reading out the voice data written in RAM by successive predetermined amounts for recording on the optical disc. A RAM controlling circuit is provided in the disc reproducing apparatus or the disc recording apparatus for dividing the storage region of RAM at least into a voice data recording region for recording the voice data and an error flag recording region for storing error flags, calculating the residual vacant space of the voice data recording region from the voice data write addresses for writing the voice data recording region and the voice data read address for reading the voice data from the voice data recording region and controlling the voice data write address while controlling the error flag write address for recording error flags in the error flag recording region in accordance with the voice data write address. Since there is no necessity of providing plural private RAMs for the voice data recording region and for the error flag storage region it is possible to write and read plural types of data in one and the same RAM.

7 Claims, 8 Drawing Sheets

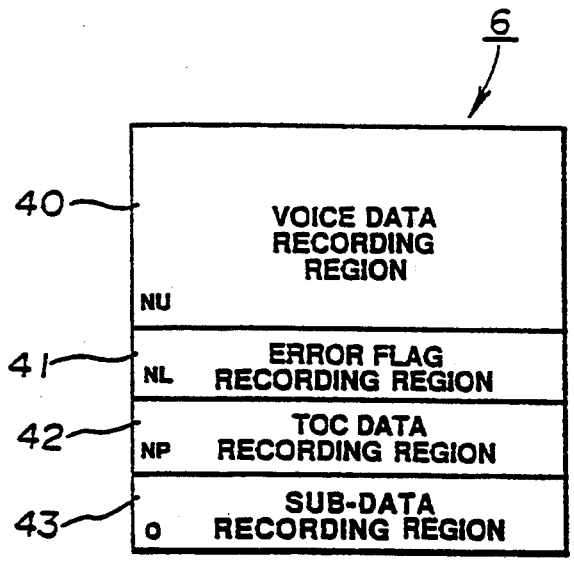
FIG.6
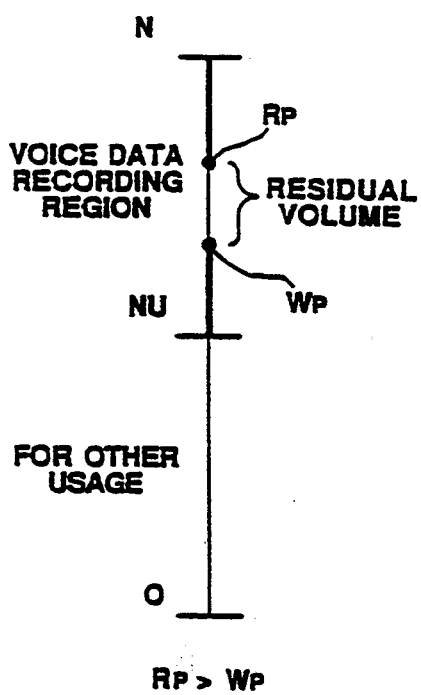
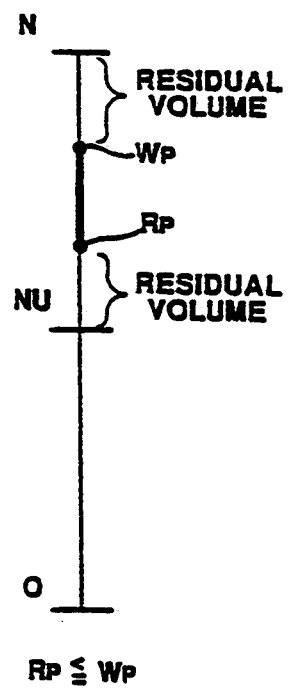
FIG. 8A   FIG. 8B

DISC REPRODUCING APPARATUS AND DISC RECORDING APPARATUS

BACKGROUND OF THE INVENTION

This invention relates to a disc reproducing apparatus for reproducing recorded data recorded on an optical disc, and to a disc recording apparatus. Such recorded data may be, for example, voice data, music data or even video data. For simplicity of explanation only, the recorded data is referred to as voice data throughout the specification, including in the claims. More particularly, it relates to a disc reproducing apparatus comprising a reproducing section for reproducing recording data recorded on an optical disc and a memory for transiently storing playback data produced by the reproducing means, in which data stored in the memory is read out at a constant rate and supplied to an output. The invention further relates to a disc recording apparatus for recording data onto a disc, in which input data transiently stored in a memory is read out of the memory for recording onto the disc.

Optical discs are used extensively as a recording medium, and they are capable of high speed accesses and semi-permanent data storage. Disc reproducing apparatuses for reproducing data recorded on optical discs are known as CD players and have been introduced commercially.

An optical disc has its entire recording region divided into a data recording area, for recording voice data to be reproduced and a lead-in area for recording, which is not to be reproduced per se, so-called table-of-contents (TOC) data, such as recording start addresses, recording end addresses or absolute time data.

Before reproducing the voice data recorded in the data recording area, the disc reproducing apparatus first reproduces the TOC data, representing the recorded contents of the voice data, from the lead-in area, for storage in a TOC memory. When a command is made to reproduce the voice data, the TOC data for the voice data designated for reproduction is read out from the TOC memory and the disc is accessed based on the readout TOC data, to reproduce the designated voice data.

The voice data recorded in the data recording area is recorded with encoding information for error correction, and an error detection operation is performed at the time of reproduction. If an error is found in the reproduced voice data, an error flag is set. This error flag is stored in an error flag memory, distinct from the voice data memory and the TOC memory. The reproduced voice data in error is processed, by a method such as by interpolation, corresponding to the error flag stored in the error flag memory.

Disturbances, such as vibrations, during reproduction of the voice data may cause reproduce skip due to abrupt track jumps. Although such reproduce skip may be prevented by providing a shock absorber mechanism to prevent the vibrations from being transmitted to the reproducing system, it is not desirable to provide such a shock absorber mechanism because the disc reproducing apparatus itself would be increased in size.

If a large capacity RAM is provided for storing the voice data reproduced from the optical disc (i.e., playback data), such that the playback data is temporarily stored in the RAM for subsequent reproduction, the playback data stored in the RAN may be again reproduced and outputted during a restoration operation for repairing the inadvertent track jump caused by such vibrations, so that voice data may be outputted continuously, despite track jumps.

However, it is necessary in this case to provide a separate TOC memory for storing the TOC data and a separate error flag memory for storing the error flags, which increases the size of the apparatus and increase production costs.

On the other hand, if the large capacity RAM is provided for storing the playback data for preventing the voice skip, a larger space needs to be provided for the RAN which also renders it difficult to meet the demand for size reduction.

OBJECT AND SUMMARY OF THE INVENTION

It is an object of the present invention to overcome the above-mentioned inconveniences of the prior art apparatuses and to provide a disc reproducing apparatus and a disc recording apparatus whereby the required memory space may be reduced to render it possible to meet the demand for reduction in size and costs.

In accordance with the present invention, there is provided a disc reproducing apparatus comprising reproducing means for reproducing recorded data recorded on an optical disc, and memory means for transiently storing playback data produced by the reproducing means, wherein the playback data stored in the memory means is read out at a constant rate and supplied at an output, wherein the apparatus further comprises memory controlling means for dividing a storage region in the memory means into at least two regions, that is a playback data storage region for storing the playback data and an error flag storage region for storing an error flag indicating an error in the playback data, the memory controlling means causing the error flag to be written in an address location of the error flag storage region associated in a one-for-one relation with the write address of the playback data in the playback data storage region, by way of address control.

In accordance with the present invention, there is also provided a disc reproducing apparatus comprising reproducing means for reproducing voice data recorded on an optical disc, and memory means for transiently storing playback data produced by the reproducing means, wherein the playback data stored in the memory means is read out at a constant rate and supplied at an output. The apparatus further comprises memory controlling means for dividing a storage region in the memory means into at least two regions, a playback data storage region for storing the playback data and an auxiliary data storage region for storing auxiliary data concerning the voice data, the memory controlling means controlling writing and reading of playback data to and from the playback data storage region and writing and reading of auxiliary data to and from the auxiliary data recording region.

Other objects and advantages of the present invention will become apparent from the following description of the preferred embodiments and the claims.

BRIEF DESCRIPTION OF THE DRAWINGS

FIG. 6 shows the organization of the RAM of FIGS. 1 and 5.

FIGS. 8(a) and 8(b) show how the size of a residual volume in the RAM is calculated.

DETAILED DESCRIPTION OF THE PREFERRED EMBODIMENTS

Figure 1:
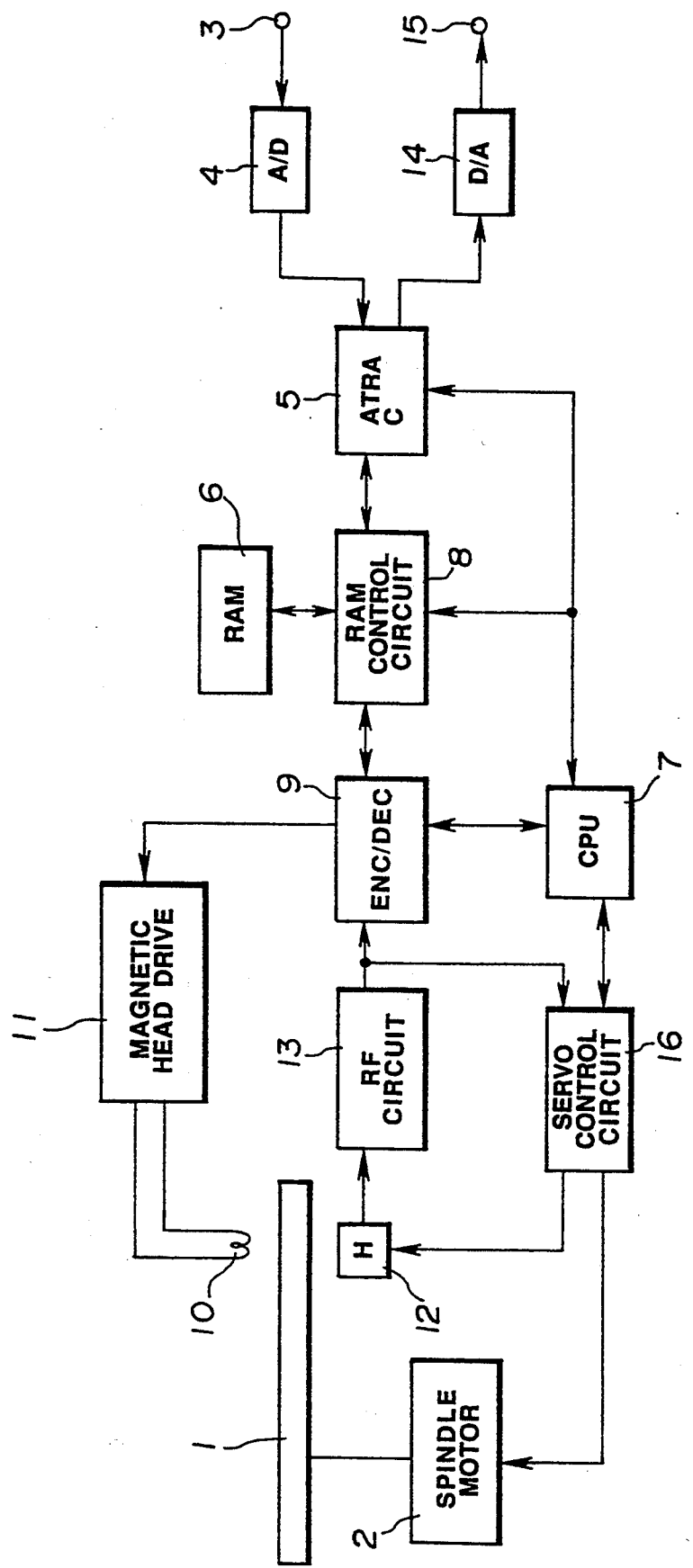
FIG. 1 shows a disc recording/reproducing apparatus in accordance with the present invention.

Referring to the drawings, illustrative embodiments of the present invention will be explained in detail.

The disc reproducing apparatus of the present embodiment may also be constructed with a recording system for recording voice data as shown for example in FIG. 1 to provide a disc recording/reproducing apparatus. With this in view, the following description is made of a disc recording/reproducing apparatus including the recording system.

The present disc recording/reproducing apparatus performs a so-called intermittent recording and reproduction in which the voice data is reproduced to obtain playback data, and the playback data is transiently stored in storage means during recording of voice data onto an optical disc and read out in successive predetermined amounts for recording on the disc. Similarly voice data recorded on the optical disc are reproduced in successive predetermined amounts for transient storage as playback data in the storage means, for subsequent reproduction from the storage means.

Specifically, the disc recording/reproducing apparatus includes an optical disc 1 for recording/reproduction of the voice data and the TOC data indicating the recording contents of the voice data, a spindle motor 2 for rotationally driving the disc 1 at, for example, a constant linear velocity, an A/D converter 4 for digitizing the voice signals supplied via input terminal 3 during the recording mode for generating the voice data, a data compression encoder/decoder 5 for compressing the voice data supplied from the A/D converter 4 during the recording mode and for expanding the reproduced voice data during the play mode, and a RAM 6 as storage means, as shown in FIG. 1.

The disc recording/reproducing apparatus also includes a RAM controlling circuit 8 as storage control means for controlling recording and reproduction of voice data, TOG data, error flags or sub-data in and from various regions of the RAM 6, that is a voice data region for storing of voice data, a TOG data recording region for storing sub-data associated with the voice data, an error flag recording region for storing error flags indicating errors in the voice data produced during the play mode as later described, and a sub-data region for storing letter or image data associated with the voice data.

The disc recording/reproducing apparatus also includes an encoder/decoder 9 for processing the voice data with encoding for error correction, such as by parity data appendage and interleaving, and with eight-to-fourteen modulation (EFM modulation) during the recording mode and for processing the voice data with decoding for error correction and EFM demodulation during the play mode, a magnetic head driving circuit 11 for driving a magnetic head 10 responsive to the voice data from the encoder/decoder 9 during the recording mode, an optical head 12 for radiating a laser beam to a site on the disc on which a magnetic field is applied by the magnetic head 10, an RF circuit 13 for extracting focusing error signals and tracking error signals from an output of the optical head 12, a servo control circuit 16 for controlling the rotation of the spindle motor 2 and the disc accessing by the magnetic head 10 or the optical head 12, and a D/A converter 14 for outputting voice data from the data compression encoder/decoder 5 during the play mode for generating voice signals and outputting the voice signals via output terminal 15.

Figure 2:
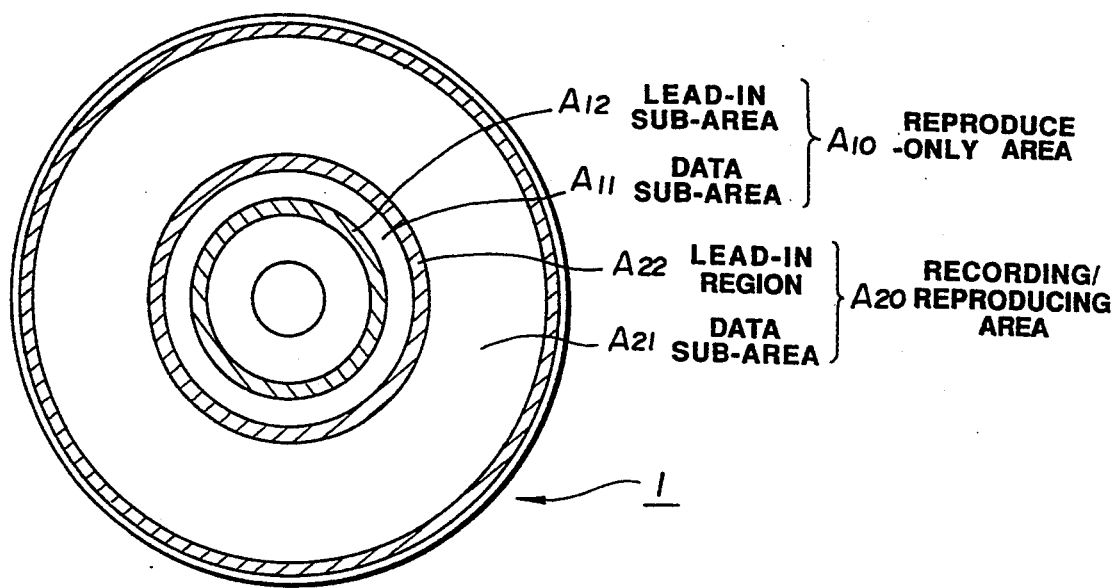
FIG. 2 shows the format of an optical disc used with the disc recording/reproducing apparatus of FIG. 1.

The optical disc 1 includes a reproduce-only area $A_{10}$ and a recording/reproducing area $A_{20}$ provided outside of the read-only area $A_{10}$, as shown in FIG. 2.

The reproduce-only area $A_{10}$ is an area in which the producer pre-records desired data, and is made up of a data recording sub-area $A_{11}$ in which data such as play data are pre-recorded and a lead-in sub-area $A_{12}$ provided radially inwardly of the sub-area $A_{11}$. In the reproduce-only area $A_{10}$, digital data are recorded as the presence or absence of pits for indicating "1" or "0", respectively. In the lead-in sub-area $A_{12}$, the recording start address data or the recording end address data etc. for the play data are recorded as TOC data for indicating the recording position or the recording contents of the data recording sub-area $A_{11}$.

The recording/reproducing area $A_{20}$ of the optical disc 1 is a photomagnetic recording region in which data may be optionally re-recorded by the user, and which is divided into a data recording sub-area $A_{21}$ for recording play data etc. and a lead-in sub-area $A_{22}$ provided radially inwardly of the sub-area $A_{21}$.

It is noted that the optical disc employed in the present invention is not limited to the above-described disc and a read-only disc or a re-recordable disc may also be employed.

Figure 3:
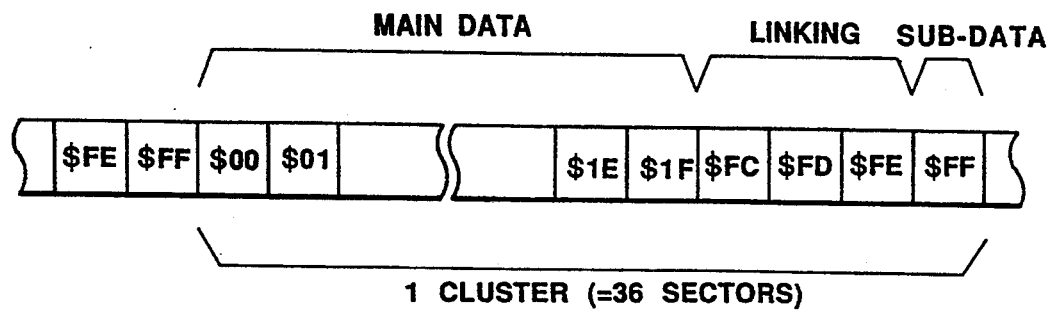
FIG. 3 shows the cluster format of recorded data in a recording/reproducing area on the disc of FIG. 2.
Figure 4:
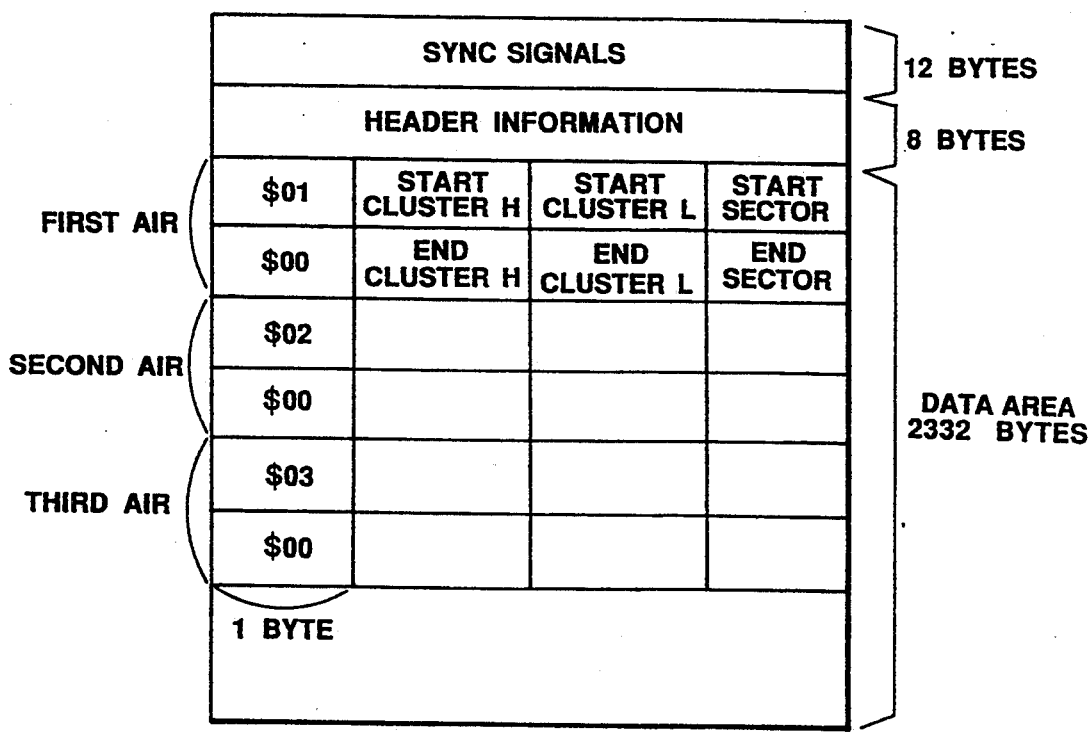
FIG. 4 shows the sector format of recorded data in the recording/reproducing area on the disc of FIG. 2.
Figure 5:
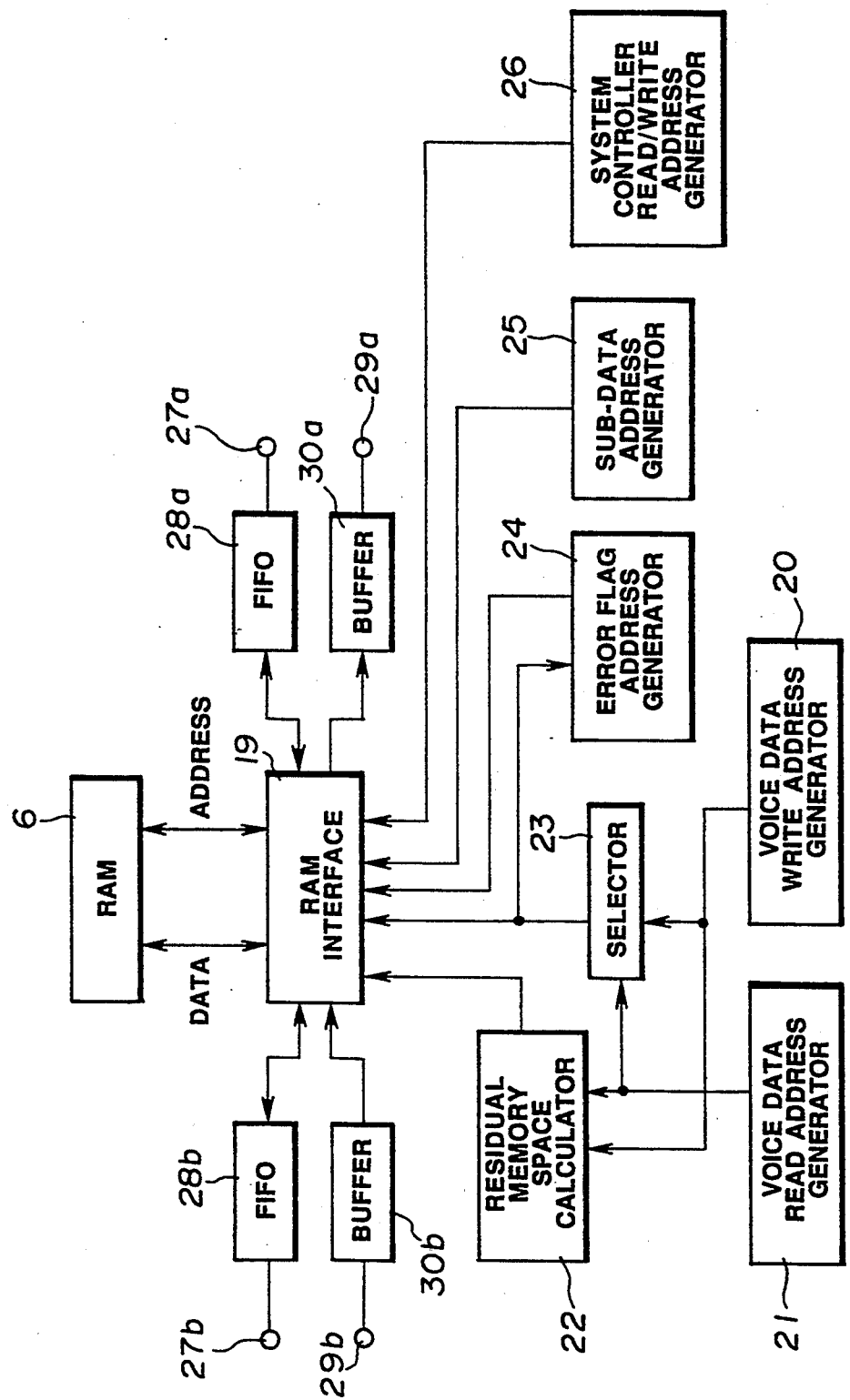
FIG. 5 shows the detail of the RAM control circuit of FIG. 1.

With the disc recording/reproducing apparatus of the present embodiment, data recording in the recording/reproducing area $A_{20}$ is performed on the cluster-by-cluster basis, in which each cluster consists of 32 sectors of main data, 3 sectors of linking data and a sector of sub-data, totalling 36 sectors, as shown in FIG. 3. Specifically, TOC data indicating the recording position or the recording contents of the recording data recorded in the data recording sub-area $A_{21}$ are recorded in the lead-in sub-area $A_{22}$. For example, a sector bearing a sector number 00 is made up of 12 bytes of synchronization signals, 8 bytes of the header data and 2332 bytes of the data area, totalling 2352 bytes, as shown in FIG. 4. In the data area, recording data items, such as the number (song number), upper byte of the start cluster, lower byte of the start cluster, start cluster or sector number 00, are recorded by allocating 8 bytes to each recording data. As shown in FIG. 5, the RAM control circuit 8 includes a voice data address generator 20 for generating voice data write addresses for recording voice data in the voice data recording area of RAM 6, a voice data read address generator 21 for generating the voice data read address for reading the voice data recorded in the voice data recording area, a residual memory space calculator 22 for calculating the residual space of the voice data area in RAM 6 from the voice data write address and the voice data read address, a selector 23 for selecting and outputting the voice data write address during recording of the voice data and selecting and outputting the voice data read address during reading of the voice data, an error flag address generator 24 for outputting an address of the error flag when the selector 23 has selected the voice data write address, a sub-data address generator 25 for generating addresses of the sub-data and a system controller read write address generator 26 for generating the read and write addresses of the system controller 7, as shown for example in FIG. 5.

The RAM control circuit 8 also includes a RAM interface 19 for recording and reading the voice data supplied via a first-in and first-out (FIFO) 28a in and from RAM 6 for subsequent outputting via FIFO 28b during the recording mode, for recording and reading the voice data supplied via FIFO 28b in and from RAM 6 for subsequent outputting via FIFO 28a during the play mode and for recording and reading error flags associated with the voice data from buffer 30b in and from RAM 6 for subsequent outputting via buffer 30a.

The operation of the present disc recording/reproducing apparatus during the recording mode of recording the desired voice data in the recording/reproducing area $A_{20}$ of the optical disc 1 is hereinafter explained.

The recording mode is designated by actuation of a recording start key, not shown.

On actuation of the recording start key, the optical disc 1 is run into rotation by the spindle motor 2 at e.g. a constant linear velocity, at the same time that desired analog voice signals are supplied via input terminal 3 to A/D converter 4. The spindle motor 2 is controlled by the servo control circuit 16 so as to be rotated at all times at a constant linear velocity.

The A/D converter 4 quantizes the voice signals for generating voice data of 2 CH×16 bit×44.1 kHz=1.4 Mbit/sec for transmitting the data to the voice compression encoder/decoder 5.

The voice compression encoder/decoder 5 is operated during the recording mode as an encoder for analyzing the 1.4 Mbit/sec data rate voice data, obtained by quantization by the A/D converter 4, into about 1,000 components along the frequency axis by orthogonal transform of the signal waveform along the time axis, with data of about 29 msec at the maximum as a block, for sequentially extracting the frequency components beginning from those components more crucial to the auditory sense, for producing the voice data having the data rate of 300 Kbits/sec. That is, the 1.4 Mbit/sec data rate voice data are compressed into voice data at one-fifth of the data rate, or the data rate of 300 Kbit/sec. These compressed voice data are outputted at a converted data rate of 15 sectors/second.

As shown in FIG. 6 the recording area of the RAM 6 is divided by RAM control circuit 8 into a voice recording region 40 for recording the voice data, an error flag recording region 41 for recording the error flags, a TOC data recording region 42 for recording the TOC data and a sub-data recording region 43 for recording the sub-data, as shown for example in FIG. 6. The error flag recording region 41 is a region for writing or reading error flags produced during the play mode as hereinafter explained and hence is not used during the recording mode.

Specifically, the entire recording area of the RAM 6 is divided so that the size of the voice data recording region 40 is "N−NU", that of the error flag recording region 41 is "NU−NL≧⅛ (N−NU)", and that of the TOC data recording region is "NL−NP", N being the size of the entire recording region of RAM 6.

The RAM 6 is used as a buffer memory for transient storage of the compressed data supplied from the voice compression encoder/decoder 5. Data recording and reading to and from RAM 6 is controlled by RAM controlling circuit 8.

The compressed data supplied from the voice compression encoder/decoder 5 has its data transfer rate reduced to one-fifth of the standard data transfer rate of 75 sectors/sec, that is to 15 sectors/sec. These compression data are continuously recorded in RAM 6. Although it suffices to record one of five sectors for recording on the disc, since the remaining four sectors represent the vacant area to produce significant wastage in the data capacity, continuous recording is performed on the disc, as hereinafter explained. Recording on the disc is made intermittently with the data transfer rate of 75 sector/sec with the above-mentioned cluster as a recording unit. That is, the compressed data recorded continuously at the low transfer rate of 15 (75/5) sectors/sec conforming to the bit compression rate in RAM 6 is read out intermittently at the transfer rate of 75 sectors/sec. The overall data transfer rate for data read out from RAM 6 so as to be recorded on the disc, inclusive of the non-recording period, is the low rate of 15 sectors/sec. However, the instantaneous data transfer rate within the time period of the intermittent recording operation is 75 sectors/sec.

Figure 7:
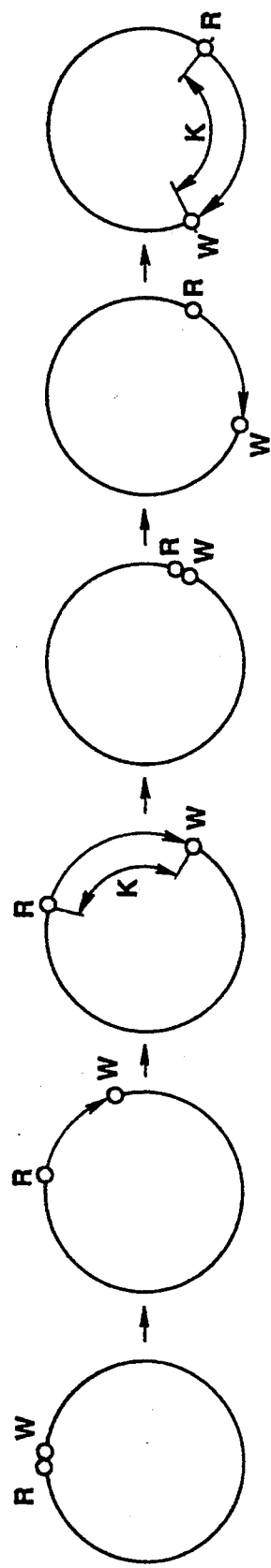
FIG. 7 shows the control of read and write pointers for reading from and writing into the RAM during a recording operation of the apparatus of FIG. 1.

Referring now to FIG. 7 the RAM controlling circuit 8 performs a controlling operation for RAM 6 in such a manner that the compressed data are recorded continuously in RAM 6 at the transfer rate of 15 sectors/sec by incrementing the write pointer W of RAM 6 at the transfer rate of 15 sectors/sec and, when the data volume of the compressed data stored in RAM 6 exceeds a predetermined volume K, the compressed data are read by the predetermined volume K from RAM 6 at the transfer rate of 75 sectors/sec, by incrementing the read pointer R at the transfer rate of 75 sectors/sec, as shown in FIG. 7.

By writing the compressed data in RAM 6 from the data compression encoder/decoder 5 at e.g. the transfer rate of 15 sectors/sec, and by reading out the compressed data from RAM 6 as the recording data by the predetermined amount K at the transfer rate of 75 sectors/sec when the data volume of the compressed data stored in RAM 6 exceeds the predetermined volume K, in accordance with the above-described memory control by the RAM control circuit 8, input data can be continuously recorded in RAM 6, while a data writing area in excess of a predetermined volume is perpetually maintained in RAM 6.

The system 7 controls the recording position on the recording track of the optical disc 1 during the above-mentioned non-recording period so that the recording data intermittently read out from RAM 6 is recorded continuously on the recording track of the optical disc 1.

Since the da%a writing area in excess of the predetermined data volume is always maintained in RAM 6, in the above-mentioned manner, the input data may be continuously recorded in the data writing area under memory control of the RAM control circuit 8, even when an occurrence of a track jump, for example, due to disturbances, is detected by system controller 7 to interrupt the recording operation on the optical disc 1. Since an operation of restoration may be performed in the interim, the input data may be recorded in the continuous state on the recording track of the optical disc 1.

Recording and readout of the compressed data on and from RAM 6 is explained in more detail. Compressed data from data compression encoder/decoder 5 are supplied to FIFO 28a via terminal 27a of RAM control circuit 8 shown in FIG. 5. FIFI 28a first stores and then subsequently outputs the compressed data. The compressed data outputted from FIFO 28a with four bytes as one unit is supplied via RAM interface 19 to RAM 6. Voice data write addresses designating the write addresses for the compressed data are outputted from voice data write address generator 20 so as to be supplied to RAM 6 via selector 23 and RAM interface 19.

In this manner, the compressed data outputted from FIFO 28a at an interval of four bytes are written by the voice data write addresses in the voice data recording region 40.

Meanwhile, sub-data associated with the compressed data are included in the compressed data. By the system controller 7 detecting the addresses in the voice data recording region 40, by which the compressed data have been written, and supplying detected data to sub-data address generator 25, these sub-data are recorded in the sub-data recording region 43 in accordance with the sub-data write addresses outputted by the sub-data address generator 26.

The compressed data recorded in the voice data recording region 40 are read out in accordance with the voice data read addresses outputted from voice data read address generator 21 and supplied via selector 23 and RAM interface 19. The compressed data read out from voice data recording region 40 is outputted after having been stored in FIFO 28b. The compressed data outputted from FIFO 28b is supplied via terminal 27b to encoder/decoder 9.

The sub-data written in sub-data recording region 43 is read out in accordance with the sub-data read addresses supplied from sub-data address generator 25 via RAM interface 19. The sub-data read out from sub-data recording region 43 is supplied via FIFO 28b and terminal 27b to encoder/decoder 9.

On the other hand, the TOC data written in the TOC data recording region 42 is read out after the end of recording of the compressed data on the optical disc 1, in accordance with the system controller read addresses supplied from the system controller read-write address generator 26 via RAM interface 19. The TOG data read out from the TOG data recording region 42 is supplied to encoder/decoder 9 via FIFO 28b and terminal 27b.

By dividing the overall recording area of RAM 6 into plural recording sub-regions, that is, voice recording region 40, error flag recording region, TOC data recording region 42 and sub-data recording region 43, controlling the writing of the compressed data into the voice data recording sub-area 40 in accordance with the voice data write address from voice data write address generator 20, controlling the readout in accordance with the voice data read address from voice data read address generator 1, controlling the sub-data recording and readout on and from sub-data recording region 43 in accordance with sub-data write address and sub-data read address from sub-data address generator 24, and by controlling the TOC data recording and readout on and from TOC data recording region 42 in accordance with the system controller write addresses and system controller read addresses from system controller read/write address generator 26, in the manner as described above, it becomes possible to write or read plural types of data on and from the same RAM.

Since there is not necessity to provide separate RAMs for data recording and readout, and only one RAM suffices, the space set aside for RAM may be diminished to contribute to a size reduction of the recording and/or reproducing apparatus.

The encoder/decoder 9 performs an operation of encoding for error correction or an EFM operation on the compressed data intermittently supplied thereto from RAM 6. The encoded compressed data from encoder/decoder 9 are supplied to the magnetic head driving circuit 11.

The magnetic head driving circuit 11 causes the magnetic head 10 to be run in rotation for applying a magnetic field modulated in accordance with the above-mentioned compressed data.

Figure 9:
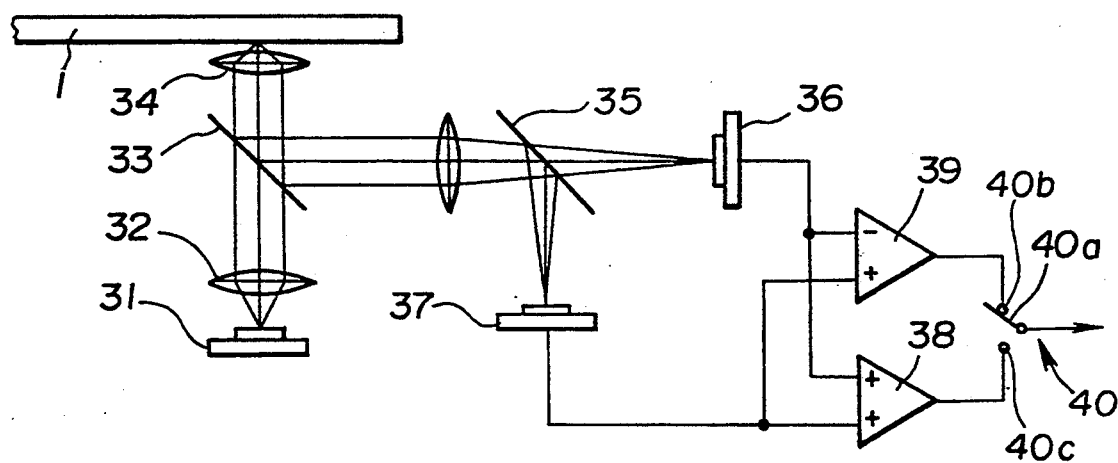
FIG. 9 shows the operation of the mechanical head of FIG. 1.

The optical head 12 comprises optical components, as shown in FIG. 9 such as a laser light source, e.g. a laser diode 31, a collimator lens 2, a beam splitter 33, an object lens 34 or a polarization beam splitter 35, first and second photodetectors 36, 37 for detecting the light beams separated by the polarization beam splitter 35, a first node or an additive node 38 for additively combining detection outputs from photodetectors 36, 37 and a second node or a subtractive node 39 for subtractively combining the detection outputs, as shown for example in FIG. 9, and is provided facing the magnetic head 16 with the optical disc 16 in-between.

During the recording mode, the optical head 12 radiates a laser bream to a target track on the optical disc 1 on which the magnetic field modulated in accordance with the recording data is applied by the magnetic head 10 driven by the magnetic head driving circuit 11. In this manner, desired voice data is thermomagnetically recorded on the data recording sub-area $A_{21}$ of the optical disc 1.

During the recording mode and the play mode as later described, the optical head 12 detects the laser light reflected from the target track for detecting the focusing error and the tracking error by a so-called astigmatic method and by a so-called push-pull method, respectively.

A changeover switch 40 provided in the optical head 12 is changed over under control of system controller 7 so that a fixed terminal 40c is selected and contacted by a movable contact 40a during the recording mode. In this manner, a sum signal from the additive node 38, which is a sum of detection outputs from the photodetectors 36, 37, is supplied during the recording mode to RF circuit 13 shown in FIG. 1.

The RF circuit 13 extracts the focusing error signals and tracking signals from the output of optical head 12 to supply the extracted signals to servo control circuit 16, while converting the playback signals into corresponding binary-valued signals and outputting the binary-valued signals to the encoder/decoder 9.

The servo control circuit 16 is made up e.g. of a focusing servo controlling circuit, a tracking servo controlling circuit, a spindle motor servo controlling circuit, a thread servo controlling circuit, etc.

The focusing servo controlling circuit controls the optical system of the optical head 12 for reducing the focusing errors to zero. The tracking servo controlling circuit tracking controls the optical system of the optical head 12 for reducing the tracking error signal to zero. The spindle motor servo controlling circuit controls the spindle motor 2 for rotationally driving the optical disc 1 with the constant linear velocity or with the constant angular velocity. The thread servo controlling circuit causes the optical head 12 and the magnetic head 10 to be moved to a target track position on the optical disc 1 designated by the system controller 7.

The servo controlling circuit 16, performing the above described controlling operations, transmits the information indicating the operating states of the various parts controlled by servo controlling circuit 16 to system controller 7.

The system controller 7 controls the controlling circuits in accordance with the information indicating the operating states of the above-mentioned components for supervising the recording position on the recording track traced by the magnetic head 12 and the magnetic head 10, while supervising the playback position on the recording track during the playback mode as later explained.

The system controller 7 automatically produces a TOC data table, composed of TOC data indicating the recording positions of the data recording sub-area $A_{21}$ of the recording/reproducing area $A_{20}$, in TOC data recording region 42 of RAM 6, while recording the voice data, and reads out the TOC data on termination of the recording of the voice data for recording in the lead-in sub-area $A_{22}$.

The operation of the recording and/or reproducing apparatus of reproducing the voice data continuously recorded on the recording tracks of the reproduce-only area $A_{10}$ and the recording/reproducing area $A_{20}$ is hereinafter explained.

When the optical disc 1 is set on the disc recording and/or reproducing apparatus, system controller 7 previously causes the optical disc 1 to be run in rotation with the constant linear velocity for reading the TOC data from the lead-in sub-area $A_{12}$ of the reproduce-only area $A_{10}$ for supervising the playback position of the data sub-area $A_{11}$ of the reproduce-only area $A_{10}$ of the optical disc 1. The TOC data reproduced from the lead-in sub-area $A_{12}$ of the reproduce-only area $A_{10}$ are written in the TOC data recording region 42 of RAM 6.

Also the system controller 7 causes the TOC data to be read out from the lead-in sub-area $A_{22}$ of the recording/reproducing area $A_{20}$ for controlling the playback position with respect to the data sub-area $A_{21}$ of the recording/reproducing area $A_{20}$. The TOC data reproduced from the lead-in sub-area $A_{22}$ of the recording/reproducing area $A_{20}$ is also recorded in the TOC data recording region 42 of RAM 6 under control by RA controlling circuit 6.

The apparatus is now in a stand-by state of waiting for designation of the playback mode by actuation of a playback start key, not shown.

When the playback start key is actuated to set the playback mode, system controller 7 causes the spindle motor 17 to be run in rotation at the constant linear velocity for rotationally driving the optical disc 1, while causing the TOC data for the designated playback mode, pre-recorded in the TOC data recording area 42, to be read out to cause the optical head 12 to be moved in accordance with the read-out TOC data to a position at which the voice data designated to be read out is recorded.

When data is to be reproduced from the reproduce-only area $A_{10}$ of the optical disc 1, the optical head 12 detects changes in the reflected laser light volume from the target track to produce playback signals. Thus the detection outputs of the photodetectors 36, 37 are combined in an additive mode by the additive node 38 to produce a sum signal which is supplied to RF circuit 19 via changeover switch 40. When data is to be reproduced from the recording/reproducing area $A_{20}$ of the optical disc 1, the optical head 12 detects changes in the difference in the angle of polarization (Kerr rotation angle) of the laser light reflected from the target track to produce the playback signals. Thus the detection outputs of the photodetectors 36, 37 are combined in a subtractive mode by the subtractive node 39 to produce a subtraction signal which is outputted via changeover switch 40.

The playback signals outputted via the changeover switch 40 are converted into corresponding binary-valued signals by the RF circuit 13 before being supplied to encoder/decoder 9.

The encoder/decoder 9 is operated as a decoder during the playback mode for processing the binary-valued playback output of the RF circuit 13 with decoding for error correction and EFM demodulation for reproducing the compressed data at a transfer rate of 75 sectors/sec for outputting as the reproduced data.

These reproduced data are recorded in RAM under control by RAM control circuit 8 for reading subsequently.

The RAM 6 is controlled as to data writing and readout by RAM controlling circuit 8 so that the playback data supplied from encoder/decoder 9 at the transfer rate of 75 sectors/sec is written therein at the transfer rate of 75 sectors/sec. The playback data recorded at the transfer rate of 75 sectors/sec in RAM 6 is read out continuously at the transfer rate of 15 sectors/sec.

The RAM controlling circuit 8 causes the playback data to be written in RAM 6 at the above-mentioned transfer rate of 75 sectors/sec so as to be read out continuously at the above-mentioned transfer rate of 15 sectors/sec by way of a memory controlling operation. Besides, the RAM controlling circuit 8 controls the playback position so that the playback data written in RAM 6 by such memory controlling operation are reproduced from a continuous position of the recording track of the optical disc 1. Such control of the playback position is performed by the system controller 7 controlling the position of data being reproduced from the disc 1 for causing a control signal designating the playback position on the recording track on the optical disc 1 to be supplied to the servo controlling circuit 16.

Figure 10:
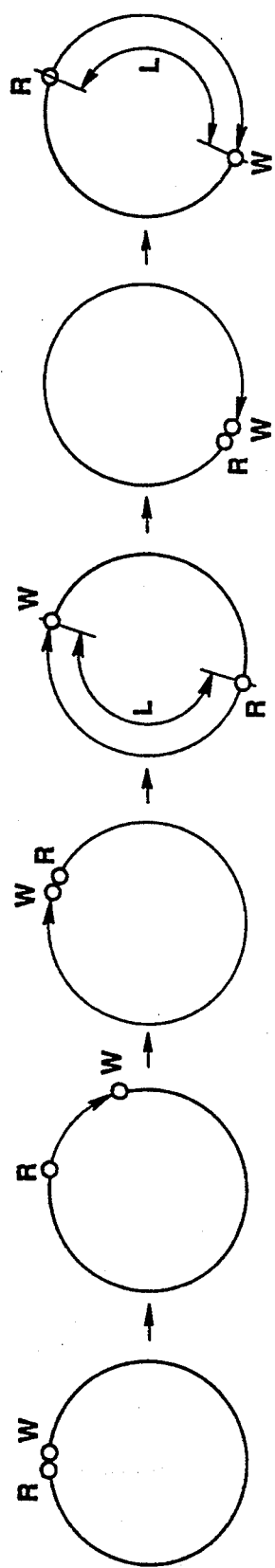
FIG. 10 shows the control of read and write pointers for reading from and writing into the RAM during a reproduction operation of the apparatus of FIG. 1.

That is, as shown in FIG. 10, RAM controlling circuit 8 performs a memory control operation of causing the playback data to be written in RAM 6 at the transfer rate of 75 sectors/sec by incrementing the write pointer W of RAM 6 at the transfer rate of 75 sectors/sec, causing the playback data to be continuously read out from RAM 6 at the transfer rate of 15 sectors/sec by continuously incrementing the read pointer R of RAM 6 at the transfer rate of 15 sectors/sec, and causing the writing in RAM 6 to be halted when the write pointer W overtakes the read pointer R so as to be started when the data volume stored in RAM 6 is below the predetermined volume L, by incrementing the write pointer W of RAM 5 in a burst fashion at the transfer rate of 75 sectors/sec, by way of memory control.

By such memory control by the RAM controlling circuit 8, the compressed data reproduced from the recording track of the optical disc 1 are written in RAM 6 intermittently at the transfer rate of 75 sectors/sec so as to be read out continuously at the transfer rate of 15 sectors/sec, so that the playback data may be read out continuously while maintaining a data readout area in RAM 6 in excess of the predetermined data volume L. The playback data read out intermittently from optical disc 1 may be reproduced in a continuous state from the recording track of the optical disc 1 by the system controller 7 controlling the playback position on the recording track of the optical disc 1. Since a data readout area in excess of the predetermined volume L is perpetually maintained in RAM 6, analog signals may be continuously outputted by reading out playback data and expanding the playback data in excess of the predetermined volume K stored in the readout area, while the operation of restoration may be performed in the interim.

By the encoder/decoder 9 performing an error correcting operation on the playback data reproduced from the optical disc 1, an error flag is set and outputted along with the playback data when an error is found to have been incurred in the playback data.

The playback data are supplied to FIFO 28b via a terminal 27b shown in FIG. 5 for storage therein and for being outputted subsequently. The playback data outputted from FIFO 28b with four bytes as a unit are written in a voice data recording area 40 of RAM 6 designated by the voice data write address outputted from voice data write address generator 20 via selector 23.

The residual memory space calculator 22 calculates the residual vacant space of the voice data recording area 40 from the voice data write address and the voice data read address.

That is, with the pointer of the voice data read address $R_p$ and the pointer of the voice data write address $W_p$, with $R_p > W_p$, the residual vacant space $M_R$ is given by $$M_R = R_p - W_p - 1$$

as shown in FIG. 8a.

If $R_p \leq W_p$, the residual vacant space $M_R$ is given by $$M_R = (R_p - NU) + (N - W_p)$$

as shown in FIG. 8b.

The residual memory space calculator 22 transmits the results of the memory space calculation to RAM 6 via RAM interface 19.

On the other hand, the error flag 1 is formed at a rate of one bit for 1-byte playback data so that four bits are stored via terminal 29b in buffer 30b.

If the selector 23 selects the voice data write address supplied from voice data write address generator 20, the voice data write address is supplied to RAM interface 19, while being supplied simultaneously to error flag address generator 24.

When supplied with the voice data write address, the error flag address generator 24 calculates the error flag address CA by $$CA = NL + \tfrac{1}{8}(MA - NU)$$

by setting the memory capacity of the entire storage capacity of RAM 6 to "N", the storage capacity of the voice data recording area 40 to "N−NU", the storage capacity of the error flag recording area 41 to be $NU - NL \geq \tfrac{1}{8}(N - NU)$ and by setting the voice data write address supplied from the voice data write address generator 20 to be MA. The error flag address CA, as the result of calculation, is supplied via interface 19 to RAM 6.

In this manner, after the four-byte playback data is written from flag recording in the voice data recording area 40 in accordance with the above-mentioned voice data write address, the 4-bit error flag associated with the 4-byte voice data is read out from buffer 30b so as to be written in the error flag recording region 41 in accordance with the above-mentioned error flag address outputted from the error flag generator 24 and the residual memory space of the voice data recording region 40 calculated in accordance with the above formula.

The playback data recorded in the voice data recording region 40 is read, via RAM interface 19, responsive to the voice data read address outputted from voice data read address generator 21 via selector 23, so as to be stored in FIFO 28a. When the 4-byte playback data is stored in FIFO 28a, a 4-bit error flag associated with the playback data stored in FIFO 28a is read out from the error flag storage area so as to be supplied to buffer 30a. The error flag supplied to buffer 30a is outputted bit by bit via terminal 29a along with the playback data outputted byte by byte from FIFO 28a via terminal 27a.

The playback data and the error flag are supplied to the voice compressing encoder/decoder 5.

By providing the voice data recording region 40 as the playback data recording area and the error flag recording region 41 in this manner in the recording region of RAM 6, calculating the residual vacant space of the voice data recording region 40 by the residual memory space calculator 22, and by controlling the error flag writing and readout in accordance with error flag addresses calculated by the error flag address generator 24 based on the calculated residual vacant area and the voice data recording state in the voice data recording area, it becomes possible to use the voice data recording and readout RAM as such and as the error flag recording and readout RAM, so that the private RAM for recording the error flags may be eliminated to contribute to reduction in the mounting space and size of the apparatus.

Besides, by recording the error flags in addresses associated in a one-for-one relation with the addresses for the playback data, the error mapping information for confirming the state of occurrence of error data may be procured easily.

During the playback mode, the voice compression encoder/decoder 5 is operated as a decoder in the operating mode designated by system controller 7, for expanding the compression data by a factor of five for forming the voice data, which is the digital data transmitted at the transfer rate of 75 sectors/sec, and for supplying the voice data to D/A converter 14.

In this manner, by dividing the storage area of RAM 6 by the RAM controlling circuit 8 into the voice data recording region 40, error flag recording regon 41, TOC data recording region 42 and sub-data recording region 43, controlling the writing of the compressed data in the voice data recording region 40 in accordance with the voice data write addresses from the voice data address generator 20, controlling the read-out voice data readout address generator 21, controlling the writing and readout of the sub-data in the sub-data recording region 43 in accordance with the sub-data write addresses and the sub-data read addresses from the sub-data address generator 24, and by controlling the TOC data writing and readout in the TOC data recording region 42 in accordance with the system controller write addresses and system controller read addresses from the system read-write address generator 26, it becomes possible with the disc recording/reproducing apparatus to write or read plural kinds of data in or from the sole RAM.

Since it suffices to provide a singe RAM for writing and readout of the above data, it becomes possible to reduce the mounting space for the RAM to reduce costs and the size of the apparatus.

Although the foregoing description has been made in connection with an embodiment in which the disc reproducing apparatus according to the present invention is constructed in conjunction with a recording system, it is to be noted that the present invention may also be applied to the disc reproducing apparatus as well.

What is claimed is:

1. A disc reproducing apparatus comprising:
reproducing means for reproducing voice data recorded on an optical disc into playback data;
error flag generating means for generating error flags indicating errors in the playback data;
memory means;
memory controlling means for dividing a storage region in the memory means into at least two sub-areas, a playback data storage sub-area for storing the playback data and an error flag storage sub-area for storing error flags, said memory controlling means causing the error flags to be written into the error flag storage sub-area in locations associated in a one-for-one relation with the locations in the playback data storage sub-area of the playback data in error;
means for calculating the size of a vacant space in the playback data storage sub-area based on a voice data write address value and a voice data readout address value; and
means for causing the writing of playback data in the playback data storage sub-area to be terminated when the size of the vacant space is less than a first pre-determined amount.

2. A disc reproducing apparatus as in claim 1, further comprising:
means for causing the writing of playback data into the playback data storage sub-area to be started when the vacant space exceeds a second predetermined amount.

3. The disc reproducing apparatus as in claim 1, further comprising:
means for reading the playback data out of the memory means at a substantially constant rate.

4. The disc reproducing apparatus as claimed in claim 1, wherein the playback data is stored in compressed form in the playback data storage sub-area, further comprising:
means for expanding the compressed playback data and reading the expanded playback data out of the memory.

5. The disc reproducing apparatus as claimed in claim 1 wherein the error flags are one bit for each one byte of playback data
whereby the storage capacity of the error flag storage sub-region is set to one-eighth or more of the storage capacity of the playback data storage sub-area.

6. The disc reproducing apparatus as claimed in claim 5 wherein the memory controlling means causes each error flag associated with the playback data to be written in an address CA $$CA = NL + \frac{1}{8}(MA - NU)$$

for the playback data write address MA, where NU is a start address in the playback data storage sub-area and NL is a start address in the error flag storage sub-area.

7. The disc reproducing apparatus as claimed in claim 1 wherein the memory controlling means further causes auxiliary data, other than the playback data and the error flags, to be written into an auxiliary storage sub-area in the memory means.

* * * * *